United States Patent
Reber et al.

(10) Patent No.: US 6,953,937 B2
(45) Date of Patent: Oct. 11, 2005

(54) METHOD AND APPARATUS FOR THE DETECTION OF NEUTRONS AND GAMMA RAYS

(75) Inventors: Edward L. Reber, Idaho Falls, ID (US); Rahmat Aryaeinejad, Idaho Falls, ID (US); David F. Spencer, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 287 days.

(21) Appl. No.: 10/607,735

(22) Filed: Jun. 26, 2003

(65) Prior Publication Data

US 2004/0262530 A1 Dec. 30, 2004

(51) Int. Cl.[7] .................................................. G01T 1/00
(52) U.S. Cl. ........................ 250/395; 250/364; 250/391
(58) Field of Search .................................. 250/364, 391, 250/395

(56) References Cited

U.S. PATENT DOCUMENTS 4,217,497 A * 8/1980 Daniels et al. .............. 250/369
5,884,234 A * 3/1999 Jorion et al. .................. 702/66

* cited by examiner

Primary Examiner—Constantine Hannaher
(74) Attorney, Agent, or Firm—Dahl & Osterloth, LLP (57) ABSTRACT

A pulse discrimination method for discriminating between pulses having a short decay period and a long decay period, may comprise: Detecting the pulse; integrating a rise portion of the pulse; integrating a decay portion of the pulse; and comparing the integrated rise portion of the pulse with the integrated decay portion of the pulse to distinguish between a pulse having a long decay period and a pulse having a short decay period.

20 Claims, 4 Drawing Sheets

METHOD AND APPARATUS FOR THE DETECTION OF NEUTRONS AND GAMMA RAYS

CONTRACTUAL ORIGIN OF THE INVENTION

The United States Government has rights in this invention pursuant to Contract No. DE-AC07-99ID13727 between the U.S. Department of Energy and Bechtel BWXT Idaho, LLC.

FIELD OF INVENTION

This invention relates to radiation detectors in general and more specifically to a radiation detector for detecting neutrons and gamma rays.

BACKGROUND

Radiation detectors for detecting high energy photons (e.g., gamma ($\gamma$) rays and X-rays) are well-known in the art and are used to detect high energy photons produced by any of a wide range of radioactive materials or other types of samples. The detection, identification, and spectroscopy of such energetic photons comprises an integral part of the fields of nuclear and particle physics as well as several fields that make use of radioactivity, including, for example, medicine, forensic science, and industrial inspection applications. Radiation detectors are also used at nuclear power plants and laboratories to monitor and study radiation.

Ionizing radiation detectors, such as gamma ($\gamma$) ray detectors, can be classified into one of two types depending on the apparatus that is used to detect the high energy photons. The first type, referred to herein as "gas tube" or simply "gas" detectors utilizes a gas-filled chamber or tube which contains a positively charged wire. When a high energy photon enters the chamber it may ionize a gas atom, causing it to release an electron or electrons in the process. The liberated electron or electrons may in turn ionize additional gas atoms, which liberate yet more electrons. The liberated electrons are collected by the positively charged wire. A detection circuit connected to the wire measures the charged delivered to the wire by the electrons. Generally speaking, the higher the energy of the incoming photon, the more atoms are ionized and the more electrons are liberated. Therefore, the magnitude of the detected charge is generally related to the energy of the incoming photon.

Solid state detectors are similar to gas detectors described above except that the active volume (i.e., the gas) is replaced by a semiconducting material, such as germanium, although other materials may be used. Accordingly, both types of detectors have in common the property that they use the energy of the incoming photon to ionize an atom of some material. Generally speaking, solid state detectors provide superior sensitivity and resolution compared with gas tube detectors, although both types remain in use.

Besides high energy photons, radiation can also comprise high energy particles, such as alpha ($\alpha$) particles, beta ($\beta$) particles, and neutrons (n). Such high energy particle-type radiation is usually detected by other types of detectors. For example, neutrons are typically detected by using a radiator or converter which absorbs incoming neutrons and radiates charged particles. The radiated particles may then be detected by means of an ionizing type radiation detector of the type described above.

While radiation detectors for detecting high energy photons (e.g., gamma rays) and high energy particles (e.g., neutrons) exist and are being used, they are not without their problems. For example, a problem with prior art neutron detectors relates to the sensitivity of the detectors to gamma rays. Consequently, it is difficult for such detectors to discriminate (i.e., differentiate) between gamma rays and neutrons. Since both gamma and neutron radiation must be separately measured in order to accurately measure the radiation field, such neutron detectors are not particularly useful in accurately characterizing the radiation field.

One way to solve the problem of simultaneously measuring both gamma and neutron radiation is to utilize two separate detectors, one optimized for gamma ray detection and the other optimized for neutron detection. While such dual detector systems are known and have been used, they tend to be bulky, heavy, and difficult to carry. In addition, such devices tend to consume a fair amount of electrical power, thus limiting their usefulness, particularly in portable applications. While smaller, more portable detectors exist, they are typically only responsive to one type of radiation. Therefore, a user must carry two separate detectors if it is desired to monitor both gamma radiation and neutron radiation.

SUMMARY OF THE INVENTION

A pulse discrimination method for discriminating between pulses having a short decay period and a long decay period, may comprise: Detecting the pulse; integrating a rise portion of the pulse; integrating a decay portion of the pulse; and comparing the integrated rise portion of the pulse with the integrated decay portion of the pulse to distinguish between a pulse having a long decay period and a pulse having a short decay period.

A radiation detector for discriminating between gamma rays and neutrons may comprise a detector for producing pulses in response to gamma rays and neutrons. A pulse discriminator operatively associated with the detector integrates a rise portion of a pulse and a decay portion of the pulse. The pulse discriminator compares the integrated rise portion of the pulse with the integrated decay portion of the pulse to determine whether the pulse was produced by the detector in response to a gamma ray or a neutron.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
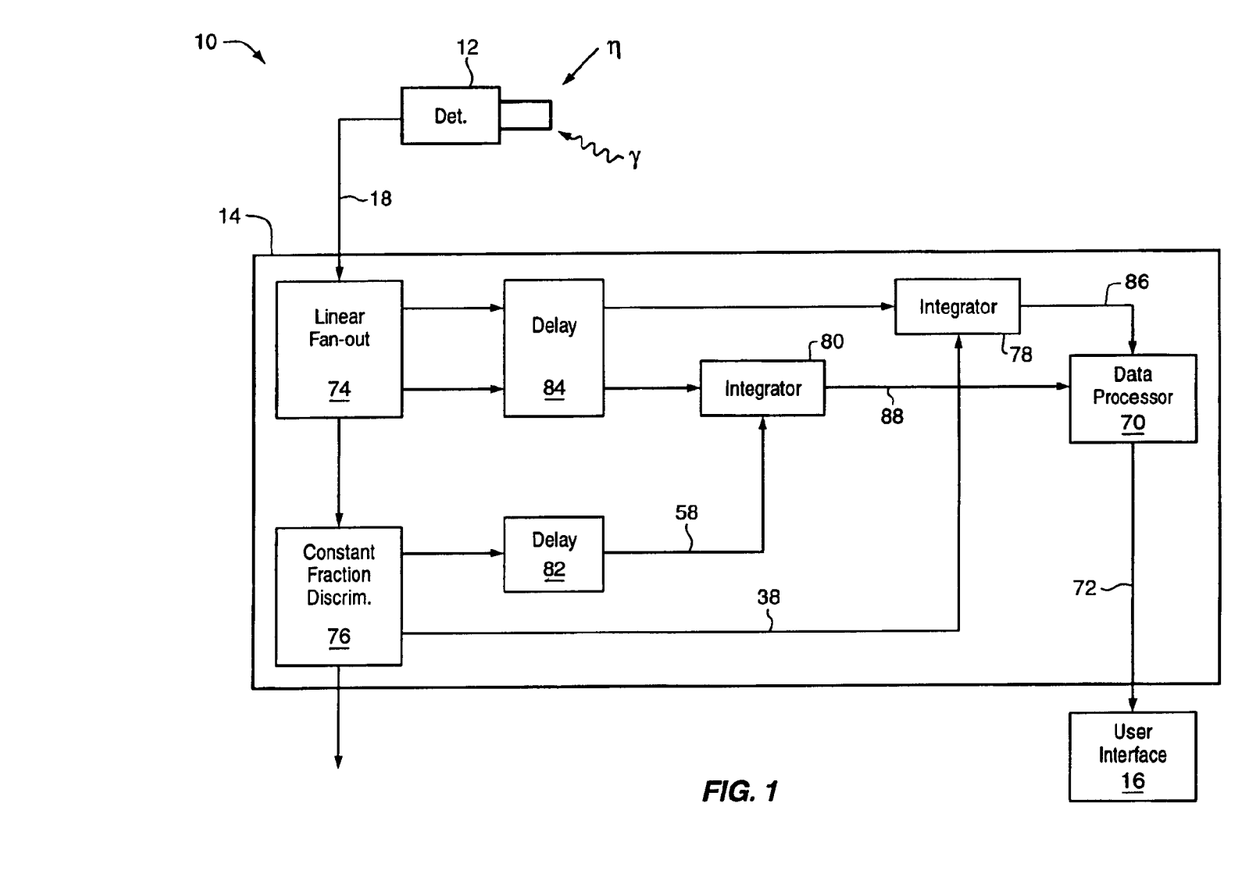
FIG. 1 is a block diagram of apparatus for detecting neutrons and gamma rays according to one embodiment of the invention.
Figure 2:
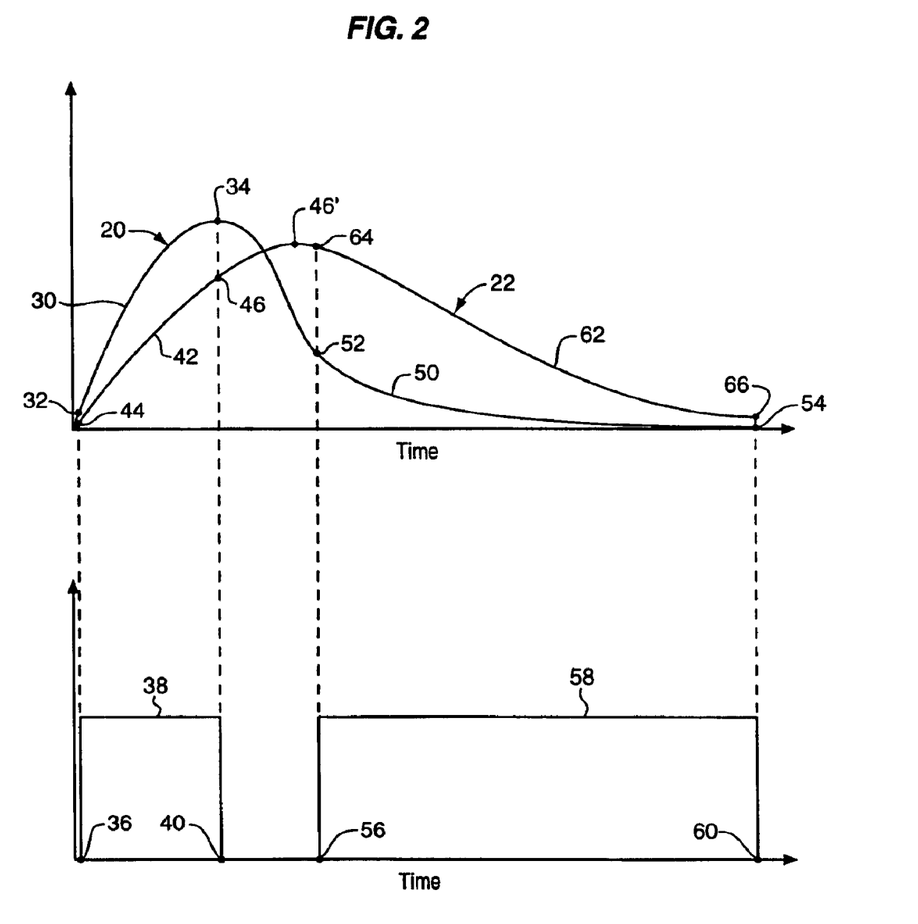
FIG. 2 is a graphical representation of a pulse having short decay period, a pulse having a long decay period and their relative temporal relation to a short gate pulse and a long gate pulse.

Apparatus 10 for detecting neutrons n and gamma rays $\gamma$ according to one embodiment of the invention is illustrated in FIG. 1 and may comprise a detector 12, a pulse discriminator system 14, and a user interface system 16. The detector 12 detects neutrons n and gamma rays $\gamma$ and produces an output signal 18 related thereto. More specifically, the output signal 18 produced by the detector 12 comprises a series of short decay period pulses, such as pulse 20 (FIG. 2), and long decay period pulses, such as pulse 22 (FIG. 2). Whether the detector 12 produces a short decay period pulse 20 or a long decay period pulse 22 depends on the particular type of radiation that is sensed or detected by the detector 12. For example, in the embodiment shown and described herein, a short decay period pulse 20 is produced by the detector 12 in response to a gamma ray γ, whereas a long decay period pulse 22 is produced by the detector 12 in response to a neutron n.

The pulse discriminator system 14 is connected to the detector 12 and is responsive to the output signal 18 produced by the detector 12. The pulse discriminator system 14 processes each pulse (e.g., a short decay period pulse 20 or a long decay period pulse 22, whichever type of pulse is being processed) in accordance with a method 24 (FIG. 3) in order to determine whether the pulse is a short decay period pulse 20 or a long decay period pulse 22. Of course, the ability to determine whether the pulse is a short decay period pulse 20 or a long decay period pulse 22 is indicative of the type of radiation detected by the detector 12. That is, a short decay period pulse 20 means the detector 12 detected a gamma ray γ, whereas a long decay period pulse 22 means the detector 12 detected a neutron n. In the embodiment shown and described herein, the user interface system 16 is used to produce for a user (not shown) an indication of whether the detected pulse was a gamma ray γ (i.e., the detected pulse was a short period pulse 20) or a neutron n (i.e., the detected pulse was a long period pulse 22). Therefore, in the embodiment shown and described herein, the apparatus 10 produces for the user an indication of whether the detector 12 detected a gamma ray γ or a neutron n.

Figure 3:
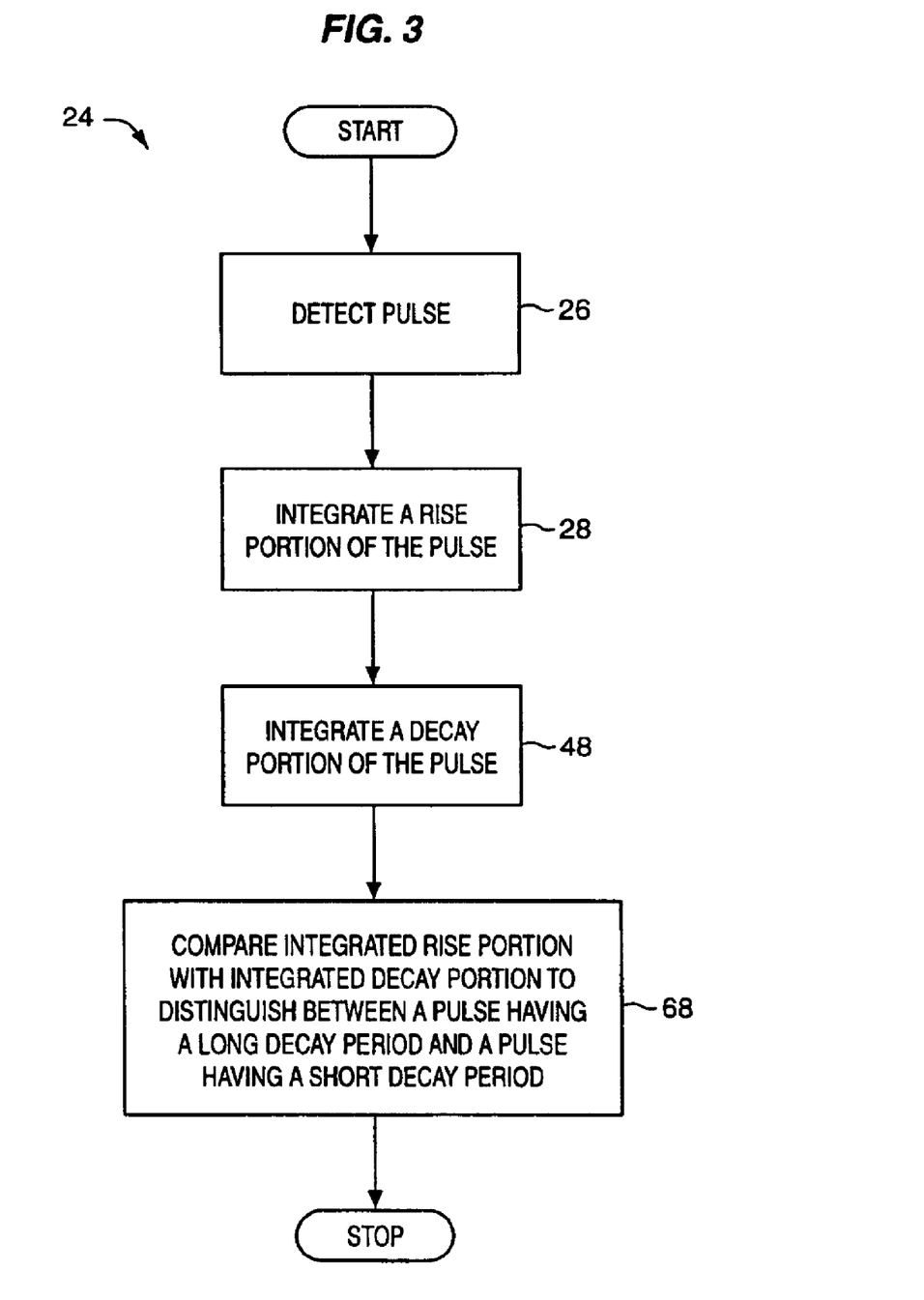
FIG. 3 is a flow diagram of a pulse discrimination method according to one embodiment of the present invention.

As briefly mentioned above, the pulse discriminator system 14 may operate in accordance with the method or process 24 (FIG. 3) in order to determine whether the pulse is a short period pulse 20 or a long period pulse 22, thus whether the detector 12 detected a gamma ray γ or a neutron n (FIG. 1). Referring now to FIGS. 2 and 3 simultaneously, a first step 26 in the method 24 involves detecting a pulse (e.g., a pulse 20 or 22) that is to be discriminated. In the embodiment shown and described herein, the step 26 of detecting a pulse involves receiving the output signal 18 produced by the detector 12 and detecting a pulse contained in the output signal 18. Once the pulse has been detected, the pulse discriminator system 14 operates to integrate a rise portion of the pulse at step 28.

However, before proceeding with the description, it should be noted that the shape or profile of the rise portion of the pulse may vary depending on whether the pulse is a short decay period pulse 20 or a long decay period pulse 22. For example, and with reference now specifically to FIG. 2, a rise portion 30 of a short decay period pulse 20 comprises that portion of the short decay period pulse 20 that extends from about an initiation threshold 32 of short decay period pulse 20 to about a peak point 34 of short decay period pulse 20. As will be described in greater detail below, the initiation threshold 32 is defined by a beginning time 36 of a short gate signal 38, whereas the peak point 34 is defined by an ending time 40 of short gate signal 38.

In the particular embodiment shown and described herein, the shape or profile of the rise portion 42 of the long decay period pulse 22 is somewhat different than that of the rise portion 30 of short decay period pulse 20 due to the elongated nature of long decay period pulse 22 compared with the short decay period pulse 20. This is because an initiation threshold 44 and peak point 46 of long decay period pulse 22 are also defined by the beginning time 36 and ending time 40 of short gate signal 38. Therefore, the peak 46 of long decay period pulse 22 may not necessarily coincide with the actual peak 46' (i.e., point of maximum value) of long period pulse 22, although it may, depending on the shape or profile of the particular peak being processed.

Proceeding now with the description, the pulse discriminator system 14 integrates the rise portion of the pulse at step 28. As described above, the rise portion of the pulse (i.e., either the rise portion 30 of short decay period pulse 20 or the rise portion 42 of long decay period pulse 22, whichever pulse is being processed) is defined by the beginning time 36 and ending time 40 of short gate signal 38. Thus, the integration of the pulse involves integrating that portion of the pulse between the initiation threshold (i.e., either initiation threshold 32 of short decay period pulse 20 or the initiation threshold 44 of long decay period pulse 22) and the peak (i.e., either peak point 34 of short decay period pulse 20 or peak point 46 of long decay period pulse 22, as the case may be).

The particular integration algorithm or technique that is used by the pulse discriminator system 14 to integrate the rise portion of the pulse (i.e., either the rise portion 30 of pulse 20 or the rise portion 42 of pulse 22) is not critical to the invention, and any of a wide range of integration algorithms, processes, or devices that are now known in the art or that may be developed in the future may be used to integrate the rise portion of the pulse (i.e., either rise portion 30 of pulse 20 or rise portion 42 of pulse 22). In any event, the integration process will yield an integrated rise value 86. Integrated rise value 86 may then be stored for later use in a suitable memory system (not shown) or other such device associated with a data processor 70 operatively associated with the pulse discriminator system 14.

The next step 48 in the process or method 24 involves integrating a decay portion of the pulse. In this regard it should be noted that, as was the case for the rise portion of the pulse, the shape or profile of the decay portion of the pulse may vary depending on whether the pulse is a short decay period pulse 20 or a long decay period pulse 22. For example, and with reference again to FIG. 2, a decay portion 50 of a short decay period pulse 20 comprises that portion of the short decay period pulse 20 that extends from about a peak point 52 of short decay period pulse 20 to about a cut-off point 54 of short decay period pulse 20. The peak point 52 is defined by a beginning time 56 of a long gate signal 58, whereas the cut-off point 54 is defined by an ending time 60 of long gate signal 58. Because the peak point 52 of short decay period pulse 20 is defined by the beginning time 56 of long gate signal 58, the peak point 52 may not necessarily coincide with the actual peak 34 (i.e., point of maximum value) of the short decay period pulse 20, although it may, again depending on the particular shape or profile of the peak being processed.

The shape or profile of the decay portion 62 of the long decay period pulse 22 is somewhat different than that of the decay portion 50 of short decay period pulse 20 in that a peak point 64 and cut-off point 66 of long decay period pulse 22 are also defined by the beginning time 56 and ending time 60 of long gate signal 58. That is, due to the elongated nature of long decay period pulse 22 compared with the short decay period pulse 20, the peak point 64 of long decay period pulse 22 coincides more closely with the actual peak 46' (i.e., point of maximum value) of long decay period pulse 22 than was the case for the short decay period pulse 20.

The pulse discriminator system 14 integrates the decay portion of the pulse at step 48. As described above, the decay portion of the pulse (i.e., either decay portion 50 of short decay period pulse 20 or decay portion 62 of long decay period pulse 22, as the case may be) is defined by the beginning time 56 and ending time 60 of long gate signal 58. Thus, the integration of the pulse involves integrating that portion of the pulse between the peak point (i.e., either peak point 52 of short decay period pulse 20 or the peak point 64 of long decay period pulse 22) and the cut-off point (i.e., either cut-off point 54 of short decay period pulse 20 or cut-off point 66 of long decay period pulse 22).

The particular algorithm or technique used by the pulse discriminator system 14 to integrate the decay portion of the pulse (i.e., either pulse 20 or 22, as the case may be) is not critical to the invention, and any of a wide range of integration algorithms, processes, or devices that are now known in the art or that may be developed in the future may be used to integrate the decay portion of the pulse (i.e., either decay portion 50 of pulse 20 or decay portion 62 of pulse 22, as the case may be). In the embodiment shown and described herein, the integration process used to integrate the decay portion of the peak is the same as that used to integrate the rise portion of the peak. The integration process yields an integrated decay value 88, which may then be stored in a suitable memory system (not shown) or other such device associated with the data processing system 70 of the pulse discriminator system 14.

In order to determine whether the peak contained in the output signal 18 from detector 12 comprises a short decay period peak 20 or a long decay period peak 22, that is, in the example of the particular embodiment shown and described herein, whether the peak was produced as the result of a gamma ray γ or a neutron n, the pulse discriminator system 14 compares the integrated rise value 86 with the integrated decay value 88 at step 68 (FIG. 3). The comparison may be based on the characteristics for the short decay period peak 20 and the long decay period peak 22 illustrated in FIG. 4 and described immediately below.

Figure 4:
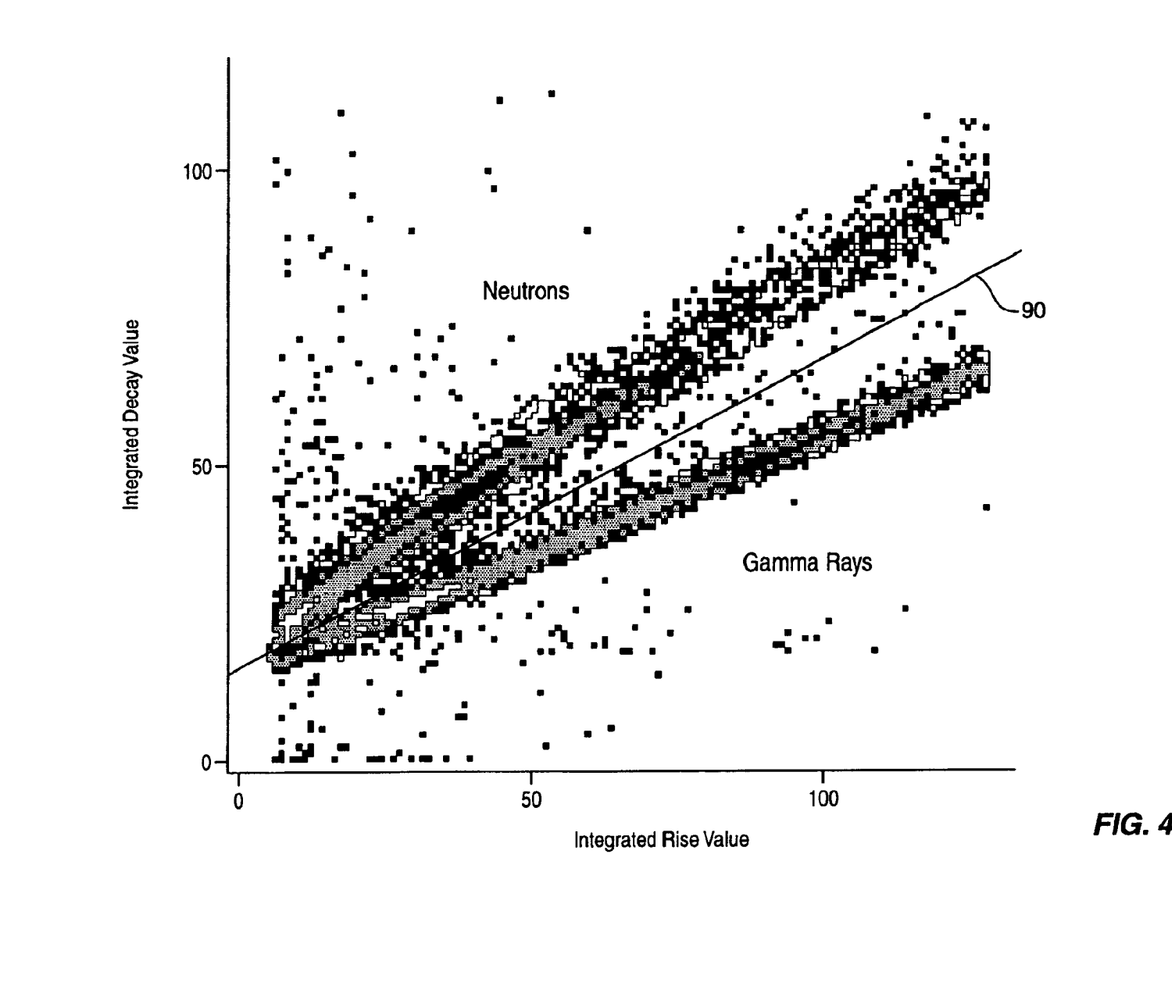
FIG. 4 is a two dimensional graphical representation of integrated values of rise portions of pulses and decay portions of pulses produced by neutrons and gammas detected by the detector.

FIG. 4 is a graphical representation of normalized integrated values of the rise portions and decay portions (identified in FIG. 4 as the "integrated rise value" and "integrated decay value" axes, respectively) for both the short decay period pulses 20 (i.e., the locus of points generally forming the line adjacent the designation "gamma rays" in FIG. 4) and the long decay period pulses 22 (i.e., the locus of points generally forming the line adjacent the designation "neutron" in FIG. 4). As can be seen from FIG. 4, the slope of the line formed by the locus of points for neutrons (i.e., long decay period pulses 22) is steeper than the line formed by the locus of points for gamma rays (i.e., short decay period pulses 20). Accordingly, by comparing the integrated value 86 of the rise portion of the pulse (i.e., portion 30 of short decay period pulse 20 or portion 42 of long decay period pulse 22) with the integrated value 88 of the decay portion of the pulse (i.e., portion 50 of short decay period pulse 20 or portion 62 of long decay period pulse 22), a determination may be made as to whether the pulse more closely fits the line (i.e., locus of points) associated with the short decay period pulse 20 (i.e., "gamma ray" line in FIG. 4) or the long decay period pulse 22 (i.e., the "neutron" line in FIG. 4).

More specifically, in the embodiment shown and described herein, an artificial line of separation 90 is constructed between the "gamma rays" line and the "neutrons line" in the manner illustrated in FIG. 4. As will be described in greater detail below, the artificial line of separation 90 is selected to be the dividing line between points that will be deemed to be associated with short decay period pulses (i.e., pulses resulting from gamma rays) and long decay period pulses (i.e., pulses resulting from neutrons). Graphically, points below the line of separation 90 will be deemed to be short decay pulses, whereas points above the line of separation 90 will be deemed to be long decay pulses.

The data processing system 70 may determine whether the pulse is a short decay period pulse (i.e., below the line of separation 90) or a long decay period pulse (i.e., above the line of separation 90) by multiplying the integrated value 86 for the rise portion of the pulse by the slope of the line of separation 90. To this product is added the intercept of the line of separation 90 (i.e., the point where the line of separation 90 intersects the "integrated decay value" axis) to yield a "calculated decay value." If the integrated decay value 88 is less then the calculated decay value, then the detected peak was a short decay period peak. Conversely, if the integrated decay value 88 is greater than the calculated decay value, then the detected peak was a long decay period peak. Thereafter, processed data 72 indicative of whether the detected pulse was a short decay period pulse 20 or a long decay period pulse 22 may be directed to the user interface 16 which may provide a suitable indication for a user (not shown) regarding the identification of the detected pulse.

A significant advantage of the method and apparatus for detecting neutrons and gamma rays according to the present invention is that it provides, in a single, highly portable unit, the ability to detect and display whether the radiation detected by the detector 12 comprises gamma radiation or neutrons. Consequently, the present invention dispenses with the need for the user to carry multiple radiation detectors.

Another advantage of the present invention is that it is capable of distinguishing between short decay period pulses 20 and long decay period pulses 22 produced by the detector 12 for gamma rays γ and neutrons n of low energy levels without having to increase the gain of the detector at such low energy levels. For example, in one preferred embodiment, the present invention is able to reliably distinguish between gamma rays and neutrons having energies as low as 50 kilo-electron-volts equivalent (keVee). Traditional pulse discrimination techniques are typically unable to resolve gamma rays and neutrons below about 300 keVee without raising the gain of the detector.

Having briefly described one embodiment of the method and apparatus of the present invention, as well as some of its more significant features and advantages, the various embodiments of the method and apparatus for the detection of neutrons and gamma rays according to the present invention will now be described in detail.

Referring back now to FIG. 1, one embodiment of apparatus 10 for detecting neutrons n and gamma rays γ may comprise a detector 12, a pulse discriminator system 14, and a user interface system 16. The detector 12 may comprise any of a wide range of radiation detectors now known in the art or that may be developed in the future suitable for detecting the types of radiation desired to be detected and that produces as an output signal 18 pulses having short decay periods and pulses having long decay periods, depending on the type of radiation detected. By way of example, in one preferred embodiment, the detector 12 comprises a xylene liquid scintillation detector available from Saint-Gobain Crystals & Detectors (formerly Bicron, Inc.) of Valley Forge, Pa. as model number BC501. As mentioned above, this liquid scintillation detector detects neutrons n and gamma rays γ and produces an output signal 18 related thereto. More specifically, a short decay period pulse 20 is produced by the detector 12 in response to a gamma ray γ, whereas a long decay period pulse 22 is produced by the detector 12 in response to a neutron n.

The pulse discriminator system 14 is connected to the detector 12 and is responsive to the output signal 18 produced by the detector 12. In the embodiment shown and described herein, the pulse discriminator system 14 comprises a linear fan-out or signal splitter 74 that receives the output signal 18 from the detector and distributes the signal to a constant fraction discriminator 76, a first integrator 78, and a second integrator 80. The linear fan-out 74 may comprise any of a wide range of devices now known in the art or that may be developed in the future that are or would be suitable for receiving the output signal 18 from the detector 12 and distributing the signal to the various devices in the manner described herein. Consequently, the present invention should not be regarded as limited to any particular device. However, by way of example, in one preferred embodiment, the linear fan-out comprises a Quad Linear Fan-In/Fan-Out available from Phillips Scientific of Ramsey, N.J., as model no. 740.

The constant fraction discriminator 76 receives the output signal 18 from the detector 12 via the linear fan-out 74 and generates the short gate signal 38 and long gate signal 58 illustrated in FIG. 2. The constant fraction discriminator 76 allows the user to select certain parameters for the short gate signal 38 and long gate signal 58. As briefly described above, the short gate signal 38 defines the rise portion of the pulse (i.e., either the rise portion 30 of short decay period pulse 20 or the rise portion 42 of long decay period pulse 22, whichever pulse is being processed). Therefore, the selection of the beginning time 36 and the ending time 40 of the short gate signal 38 defines the rise portion of the pulse that will later be integrated. Consequently, the user will select the beginning time 36 and ending time 40 of the short gate signal 38 to define the proper rise portions for the types of pulses to be integrated. By way of example, in one preferred embodiment, the time between the beginning time 36 and ending time 40 of short gate signal 38 is selected to be in the range of about 8 nanoseconds to about 30 nanoseconds (10 nanoseconds preferred). However, other times may be used depending on the nature and duration of the particular pulses that are to be discriminated.

Before proceeding with the description, it should be noted that the actual duration of the short gate signal 38 may actually be longer depending on the particular operational characteristics of the various devices comprising the pulse discriminator system 14. For example, in the embodiment shown and described herein, the integrators 78 and 80 require a "lead" time of about 20 nanoseconds before they start integrating. Therefore, the actual durations of the short gate signal 38 and long gate signals 58 are increased by this amount. However, because this first 20 nanoseconds is only required to provide the required advance or lead time for the integrators 78 and 80, the lead times do not extend the rise portion or the decay portion of the pulse. Accordingly, the lead time that is built into the short gate pulse 38 is not shown in FIG. 2. This additional lead time (e.g., 20 nanoseconds) may be compensated for by the delay circuit 84 in the manner to be described below. That is, the delay circuit 84 may be made to delay the pulse signals by an additional 20 nanoseconds so that the proper portions of the pulses are made to coincide (on a time basis) with the short and long gate signals 38 and 58, as best seen in FIG. 2.

Continuing now with the description, the constant fraction discriminator 74 may also be programmed to initiate the beginning time 36 at some suitable threshold level for the pulse being detected. Generally speaking, the threshold level at which the constant fraction discriminator 74 sets the beginning time 36 should be above the expected level of noise contained in the output signal 18 from the detector 12 in order to avoid processing false pulses. However, because the particular threshold level will vary depending on the particular components utilized in a given application, and could be easily determined by persons having ordinary skill in the art after having become familiar with the teachings provided herein, the present invention should not be regarded as limited to any particular threshold level.

The long gate signal 58 is also produced by the constant fraction discriminator 74. Because the long gate signal 58 defines the decay portion of the pulse (i.e., either the decay portion 50 of short decay period pulse 20 or the decay portion 62 of long decay period pulse 22), the selection of the beginning time 56 and the ending time 60 of the long gate signal 58 defines, in part, the decay portion of the pulse that will later be integrated. As will be described below, the decay portion of the pulse is also defined by the time by which the long gate signal 58 lags the short gate signal 38. Consequently, the user will select the interval between the beginning time 56 and ending time 60 of the long gate signal 58 to define the proper decay portions for the types of pulses to be integrated. By way of example, in one preferred embodiment, the time or interval between the beginning time 56 and ending time 60 of long gate signal 58 is selected to be in the range of about 100 nanoseconds to about 300 nanoseconds (200 nanoseconds preferred). However, other times may be used depending on the nature and duration of the particular pulses that are to be discriminated. As was the case for the short gate signal 38, the duration of the long gate signal 58 is extended by the additional lead time (e.g., 20 nanoseconds) required by the second integrator 80 in order to begin integrating. However, this additional lead time is not shown in the drawings.

In the embodiment shown and described herein the time or interval between the beginning time 36 of the short gate signal 38 and the beginning time 56 of the long gate signal 58 is controlled by a delay circuit 82. Thus, the amount of delay imposed by the delay circuit 82 is also important in defining the decay portion of the pulse that will later be integrated. Consequently, the user will also select the delay or interval between the beginning time 36 of the short gate signal 38 and the beginning time 56 of the long gate signal 58 to complete the definition of the proper decay portion for the types of pulses to be integrated. By way of example, in one preferred embodiment, the delay or interval between the beginning time 36 of the short gate signal 38 and the beginning time 56 of the long gate signal 58 is selected to be in the range of about 15 nanoseconds to about 40 nanoseconds (20 nanoseconds preferred). However, other times may be used depending on the nature and duration of the particular pulses that are to be discriminated.

The delay circuit 82 may comprise any of a wide range of delay circuits now known in the art or that may be developed in the future that are or would be suitable for use in the particular application. In addition, because such a delay circuit 82 could be easily provided by persons having ordinary skill in the art after having become familiar with the teachings provided herein, the delay circuit 82 utilized in one preferred embodiment will not be described in further detail herein.

The short gate signal 38 and long gate signal 58 are then fed to respective first and second integrators 78 and 80. The first and second integrators 78 and 80 are also connected to the linear fan-out 74 and receive the output signal 18 from the detector 12 via the linear fan-out 74. In the embodiment shown and described herein, there is a delay associated with the operation of the constant fraction discriminator 76 in producing the short and long gate signals 38 and 58. There is also a 20 nanosecond delay associated with the operation of the first and second integrators 78 and 80, as described above. Consequently, a second delay circuit 84 is positioned between the linear fan-out 74 and first and second integrators 78 and 80. The second delay circuit 84 delays the pulses contained in the output signal 18 by an amount identical to the delay imposed by the constant fraction discriminator 76 so that the pulse (i.e., short decay period pulse 20 or long decay period pulse 22), and any other delays (e.g., the 20 nanosecond lead time requirement associated with the integrators 78 and 80) is properly temporally aligned with the short and long gate signals 38 and 58, in the manner best seen in FIG. 2. Because the amount of delay required to be imposed by the second delay circuit 84 is dependent on the amount of delay imposed by the constant fraction discriminator 76 in producing the short and long gate signals 38 and 58, the lead time required by the first and second integrators 78 and 80, and any other devices, persons having ordinary skill in the art will be able to readily ascertain the amount of delay required to be imposed by the second delay circuit 84 after considering the particulars of the specific implementation of the invention. Consequently, the present invention should not be regarded as limited to any particular delay.

The second delay circuit 84 may also comprise any of a wide range of delay circuits that are now known in the art or that may be developed in the future. Consequently, the present invention should not be regarded as limited to any particular type of delay circuit. In addition, because such a delay circuit 84 may be readily provided by persons having ordinary skill in the art after having become familiar with the teachings provided herein, the delay circuit 84 utilized in one preferred embodiment will not be described in further detail herein.

The first integrator 78 receives the short gate signal 38 and delayed pulse from the second delay circuit 84. The first integrator 78 uses the short gate signal 38 as the trigger to begin and end the integration process. That is, the integrator 78 will begin integrating the pulse at the beginning time 36 and stop integrating at the ending time 40. This corresponds to integrating the rise portion of the pulse between the initiation threshold and the peak point. Actually, as mentioned above, the first integrator 78 requires a 20 nanosecond lead time before starting the integration process, so the actual portion of the short gate signal 38 that triggers the integration process is actually selected to be about 20 nanoseconds earlier than the beginning time 36. However, so long as any lead time required by the integrator 78 is accounted for, the integrator 78 will integrate the rise portion of the pulse illustrated in FIG. 2. Accordingly, if the particular pulse being integrated is a short decay portion pulse 20, the first integrator 78 will integrate the rise portion 30 of pulse 20 between the initiation threshold 32 and the peak point 34. Conversely, if the particular pulse being integrated is a long decay portion pulse 22, the first integrator 78 will integrate the rise portion 42 of pulse 22 between the initiation threshold 44 and the peak point 46. See FIG. 2. The output of integrator 78 comprises the integrated rise value 86.

The first integrator 78 may comprise any of a wide variety of systems or devices suitable for integrating the pulse in the manner described herein. Consequently, the present invention should not be regarded as limited to any particular type of integrator 78. However, by way of example, in one preferred embodiment, the first integrator 78 comprises a charge integrating analog-to-digital converter available from LeCory of Chestnut Ridge, N.Y. as model no. 2249.

The second integrator 80 receives the long gate signal 58 and delayed pulse from the second delay circuit 84. The second integrator 80 uses the long gate signal 58 as the trigger to begin and end the integration process. That is, the integrator 80 will begin integrating the pulse at the beginning time 56 and stop integrating at the ending time 60. This corresponds to integrating the decay portion of the pulse between the peak point and the cut-off point. Actually, as mentioned above, the second integrator 80 also requires a 20 nanosecond lead time before starting the integration process, so the actual portion of the long gate signal 58 that triggers the integration process is actually selected to be about 20 nanoseconds earlier than the beginning time 56. However, so long as any lead time required by the second integrator 80 is properly accounted for, the second integrator 80 will integrate the decay portion of the pulse illustrated in FIG. 2. Accordingly, if the particular pulse being integrated is a short decay portion pulse 20, the second integrator 80 will integrate the decay portion 50 of pulse 20 between the peak point 52 and the cut-off point 54. Conversely, if the particular pulse being integrated is a long decay portion pulse 22, the second integrator 80 will integrate the decay portion 62 of pulse 22 between the peak point 64 and the cut-off point 66. See FIG. 2. The output of second integrator 80 comprises an integrated decay value 88.

The second integrator 80 may comprise any of a wide variety of systems or devices suitable for integrating the pulse in the manner described herein. Consequently, the present invention should not be regarded as limited to any particular type of integrator 80. However, by way of example, in one preferred embodiment, the second integrator 80 also comprises a charge integrating analog-to-digital converter available from LeCory of Chestnut Ridge, N.Y., as model no. 2249.

The first and second integrators 78 and 80 are operatively connected to a data processor 70 which receives the integrated rise and decay values 86 and 88 and processes them in accordance with the teachings provided herein. Data processor 70 then produces output data 72 that are indicative of whether the pulse being processed comprises a short decay period pulse 20 or a long decay period pulse 22.

The data processor 70 may comprise any of a wide range of data processors that are now known in the art or that may be developed in the future that are or would be suitable for processing the integrated rise and decay values 86 and 88 in accordance with the teachings provided herein. However, because such data processors, such as data processor 70, are well-known in the art and could be readily provided by persons having ordinary skill in the art after having become familiar with the teachings provided herein, the data processor 70 that may be utilized in one preferred embodiment will not be described in further detail herein.

The user interface 16 is operatively associated with the pulse discriminator system 14 and receives the output data 72 from the data processor 70. The user interface 16 may comprise any of a wide variety of systems and devices suitable for providing for the user an indication of the identity of the detected pulse. The user interface 16 may provide a visual indication of the identity of the detected pulse, an aural indication of the identity of the detected pulse, or a tactile indication of the identity of the detected pulse. Alternatively, some combination of these indications could be provided for the user. Examples of visual indications include flashing lights or lights of different colors. Examples of aural indications include tones having different durations or of different frequencies. Tactile indications include vibrations of different durations or of different frequencies. However, because persons having ordinary skill in the art could readily provide such a user interface after having become familiar with the teachings of the present invention, the particular user interface 16 utilized in one preferred embodiment will not be described in further detail herein.

As briefly mentioned above, the various components comprising the pulse discriminator system 14 may operate in accordance with the method or process 24 (FIG. 3) in order to determine whether the pulse is a short period pulse 20 or a long period pulse 22. Referring now to FIGS. 2 and 3 simultaneously, a first step 26 in the method 24 involves detecting a pulse (e.g., a pulse 20 or 22) that is to be discriminated. In the embodiment shown and described herein, the step 26 of detecting a pulse involves receiving the output signal 18 produced by the detector 12 and detecting a pulse contained in the output signal 18. As mentioned above, the constant fraction discriminator 76 detects a pulse by comparing the output signal 18 of detector 12 with a user-selected threshold value. If the output signal 18 exceeds the threshold value, then a pulse is deemed detected. Once the pulse has been detected, the pulse discriminator system 14 operates to integrate a rise portion of the pulse at step 28.

As previously noted, the shape or profile of the rise portion of the pulse may vary depending on whether the pulse is a short decay period pulse 20 or a long decay period pulse 22. For example, and with reference now specifically to FIG. 2, the rise portion 30 of the short decay period pulse 20 comprises that portion of the short decay period pulse 20 that extends from about the initiation threshold 32 of short decay period pulse 20 to about the peak point 34 of short decay period pulse 20. The initiation threshold 32 is defined by the beginning time 36 of the short gate signal 38 produced by the constant fraction discriminator 76, whereas the peak point 34 is defined by the ending time 40 of short gate 38.

As noted, the shape or profile of the rise portion 42 of the long decay period pulse 22 is somewhat different than that of the rise portion 30 of short decay period pulse 20 in that the initiation threshold 44 and peak point 46 of long decay period pulse 22 are also defined by the beginning time 36 and ending time 40 of the short gate signal 38. That is, due to the elongated nature of long decay period pulse 22 compared with the short decay period pulse 20, the peak 46 of long decay period pulse 22 does not coincide with the actual peak 46' (i.e., point of maximum value) of long period pulse 22.

The pulse discriminator system 14 integrates the rise portion of the pulse at step 28. This is done by the first integrator 78. That is, the first integrator 78 receives the short gate signal 38 and the delayed output signal 18 from the detector 12 via linear fan-out 74 and second delay circuit 84. As described above, the rise portion of the pulse (i.e., either the rise portion 30 of short decay period pulse 20 or the rise portion 42 of long decay period pulse 22) is defined by the beginning time 36 and ending time 40 of short gate signal 38 produced by the constant fraction discriminator 76. Thus, the integration of the pulse involves integrating that portion of the pulse between the initiation threshold (i.e., either initiation threshold 32 of short decay period pulse 20 or the initiation threshold 44 of long decay period pulse 22) and the peak (i.e., either peak point 34 of short decay period pulse 20 or peak point 46 of long decay period pulse 22). First integrator 78 produces an integrated rise value 86 that is then directed to data processor 70.

The next step 48 in the process or method 24 involves integrating a decay portion of the pulse. As was the case for the rise portion of the pulse, the shape or profile of the decay portion of the pulse may vary depending on whether the pulse is a short decay period pulse 20 or a long decay period pulse 22. For example, with reference again to FIG. 2, a decay portion 50 of a short decay period pulse 20 comprises that portion of the short decay period pulse 20 that extends from about a peak point 52 of short decay period pulse 20 to about a cut-off point 54 of short decay period pulse 20. As will be described in greater detail below, the peak point 52 is defined by a beginning time 56 of a long gate signal 58, whereas the cut-off point 54 is defined by an ending time 60 of long gate signal 58. Because the peak point 52 of short decay period pulse 20 is defined by the beginning time 56 of long gate signal 58, the peak point 52 may not necessarily coincide with the actual peak 34 (i.e., point of maximum value) of the short decay period pulse 20.

The shape or profile of the decay portion 62 of the long decay period pulse 22 is somewhat different than that of the decay portion 50 of short decay period pulse 20 in that a peak point 64 and cut-off point 66 of long decay period pulse 22 are also defined by the beginning time 56 and ending time 60 of long gate signal 58. That is, due to the elongated nature of long decay period pulse 22 compared with the short decay period pulse 20, the peak point 64 of long decay period pulse 22 coincides more closely with the actual peak 46' (i.e., point of maximum value) of long decay period pulse 22 than was the case for the short decay period pulse 20.

The pulse discriminator system 14 integrates the decay portion of the pulse at step 48. This is done by the second integrator 80. The second integrator 80 receives the long gate signal 58 and the delayed output signal 18 from the detector 12 via linear fan-out 74 and second delay circuit 84. As described above, the decay portion of the pulse (i.e., either decay portion 50 of short decay period pulse 20 or decay portion 62 of long decay period pulse 22, as the case may be) is defined by the beginning time 56 and ending time 60 of long gate signal 58. Thus, the integration of the pulse involves integrating that portion of the pulse between the peak point (i.e., either peak point 52 of short decay period pulse 20 or the peak point 64 of long decay period pulse 22) and the cut-off point (i.e., either cut-off point 54 of short decay period pulse 20 or cut-off point 66 of long decay period pulse 22). The second integrator 80 produces an integrated decay value 88 that is then directed to data processor 70.

In order to determine whether the peak contained in the output signal 18 from detector 12 comprises a short decay period peak 20 or a long decay period peak 22, that is, in the example of the particular embodiment shown and described herein, whether the peak was produced as the result of a gamma ray γ or a neutron n, the data processor 70 compares the integrated rise value 86 with the integrated decay value 88 at step 68 (FIG. 3) in accordance with the characteristics for the short decay period peak 20 and the long decay period peak 22 illustrated in FIG. 4.

With reference now to FIG. 4, the slope of the line formed by the locus of points for neutrons (i.e., long decay period pulses 22) is steeper than the line formed by the locus of points for gamma rays (i.e., short decay period pulses 20). Accordingly, by comparing the integrated value 86 of the rise portion of the pulse (i.e., portion 30 of short decay period pulse 20 or portion 42 of long decay period pulse 22) with the integrated value 88 of the decay portion of the pulse (i.e., portion 50 of short decay period pulse 20 or portion 62 of long decay period pulse 22), a determination may be made as to whether the pulse more closely fits the line (i.e., locus of points) associated with the short decay period pulse 20 (i.e., "gamma ray" line in FIG. 4) or the long decay period pulse 22 (i.e., the "neutron" line in FIG. 4).

In the embodiment shown and described herein, an artificial line of separation 90 is constructed between the "gamma rays" line and the "neutrons line" in the manner illustrated in FIG. 4. The artificial line of separation 90 is selected to be the dividing line between points that will be deemed to be associated with short decay period pulses (i.e., pulses resulting from gamma rays) and long decay period pulses (i.e., pulses resulting from neutrons). Graphically, points below the line of separation 90 will be deemed to be short decay pulses, whereas points above the line of separation 90 will be deemed to be long decay pulses. The precise location of the artificial line of separation 90 (i.e., the slope and intercept of the artificial line of separation 90) may be determined in advance to be the best balance between the locus of points identified as "gamma rays" in FIG. 4 and the locus of points identified as "neutrons" in FIG. 4. That is the artificial line of separation 90 may be placed substantially between the "gamma rays" line and the "neutron" line in the manner illustrated in FIG. 4. Alternatively, other methods, such as statistical methods, may be used to locate the artificial line of separation 90.

As mention above, in one preferred embodiment, the data processing system 70 may determine whether the pulse is a short decay period pulse (i.e., below the line of separation 90) or a long decay period pulse (i.e., above the line of separation 90) by multiplying the integrated value 86 for the rise portion of the pulse by the slope of the line of separation 90. To this product is added the intercept of the line of separation 90 (i.e., the point where the line of separation 90 intersects the "integrated decay value" axis) to yield a "calculated decay value." If the integrated decay value 88 is less then the calculated decay value, then the detected peak was a short decay period peak. Conversely, if the integrated decay value 88 is greater than the calculated decay value, then the detected peak was a long decay period peak. Thereafter, processed data 72 indicative of whether the detected pulse was a short decay period pulse 20 or a long decay period pulse 22 may be directed to the user interface 16 which may provide a suitable indication for a user (not shown) regarding the identification of the detected pulse in the manner already described.

It is contemplated that the inventive concepts herein described may be variously otherwise embodied and it is intended that the appended claims be construed to include alternative embodiments of the invention except insofar as limited by the prior art.

What is claimed is:

1. A pulse discrimination method for discriminating between pulses having a short decay period and a long decay period, comprising:
   detecting the pulse;
   integrating a rise portion of the pulse;
   integrating a decay portion of the pulse; and
   comparing the integrated rise portion of the pulse with the integrated decay portion of the pulse to distinguish between a pulse having a long decay period and a pulse having a short decay period.

2. The method of claim 1, further comprising producing an indication for a user of a detected pulse having a long decay period.

3. The method of claim 1, further comprising producing an indication for a user of a detected pulse having a short decay period.

4. A pulse discrimination method for discriminating between pulses produced by a radiation detector, the radiation detector producing pulses having a short decay period in response to gamma radiation, the radiation detector producing pulses having a long decay period in response to neutrons, comprising:
   detecting a pulse;
   integrating a rise portion of the pulse;
   integrating a decay portion of the pulse;
   comparing the integrated rise portion of the pulse with the integrated decay portion of the pulse to determine whether the pulse was produced in response to gamma radiation or in response to neutrons.

5. The method of claim 4, further comprising producing an indication for a user that a gamma ray was detected for a pulse having a short decay period.

6. The method of claim 4, further comprising producing an indication for a user that a neutron was detected for a pulse having a long decay period.

7. The method of claim 4, wherein integrating a rise portion of the pulse comprises integrating over a rise time period in the range of about 8 nanoseconds to about 30 nanoseconds.

8. The method of claim 7, wherein the rise time period is about 10 nanoseconds.

9. The method of claim 4, wherein integrating a decay portion of the pulse comprises integrating over a decay time period in the range of about 100 nanoseconds to about 300 nanoseconds.

10. The method of claim 9, wherein the decay time period is about 200 nanoseconds.

11. The method of claim 4, wherein the rise portion of the pulse is defined by a beginning time and an ending time, and wherein the decay portion of the pulse is defined by a beginning time and an ending time, the beginning time of the decay portion of the pulse occurring after the beginning time of the rise portion of the pulse by a delay period.

12. The method of claim 11, wherein the delay period is in the range of about 15 nanoseconds to about 40 nanoseconds.

13. The method of claim 11, wherein the delay period is about 20 nanoseconds.

14. A radiation detector for discriminating between gamma rays and neutrons, comprising:
   detector means for producing pulses in response to gamma rays and neutrons; and
   pulse discrimination means operatively associated with said detector means for integrating a rise portion of a pulse, integrating a decay portion of the pulse, and comparing the integrated rise portion of the pulse with the integrated decay portion of the pulse to determine whether the pulse was produced by said detector means in response to a gamma ray or a neutron.

15. The radiation detector of claim 14, wherein said detector means comprises a liquid scintillator detector.

16. The radiation detector of claim 14, wherein said pulse discrimination means comprises:
   a constant fraction discriminator operatively associated with said detector, said constant fraction discriminator producing a short gate output signal and a long gate output signal;
   a first integrator operatively associated with said detector and said constant fraction discriminator, said first integrator using said short gate output signal to integrate the rise portion of the pulse; and a second integrator operatively associated with said detector and said constant fraction discriminator, said second integrator using said long gate output signal to integrate the decay portion of the pulse.

17. The radiation detector of claim 16, further comprising a delay circuit operatively associated with said constant fraction discriminator and said second integrator, said delay circuit delaying the long gate output signal.

18. The radiation detector of claim 17, wherein said short gate output signal has a duration of about 10 nanoseconds and wherein said long gate output signal has a duration of about 200 nanoseconds.

19. The radiation detector of claim 18, wherein said delay circuit delays a beginning time of the long gate output signal by about 20 nanoseconds from a beginning time of the short gate output signal.

20. The radiation detector of claim 16 further comprising a linear fan-out circuit operatively associated with said detector means, said constant fraction discriminator, said first integrator, and said second integrator.

* * * * *